United States Patent
Sanderson et al.

(10) Patent No.: US 12,552,848 B2
(45) Date of Patent: Feb. 17, 2026

(54) HYDROCHLORIDE SALTS OF C5A RECEPTOR AGONIST PEPTIDES

(71) Applicants: Board of Regents of the University of Nebraska, Lincoln, NE (US); San Diego State University Research Foundation, San Diego, CA (US)

(72) Inventors: Sam D. Sanderson, Omaha, NE (US); Edward Leroy Morgan, San Diego, CA (US)

(73) Assignees: Board of Regents of the University of Nebraska, Lincoln, NE (US); San Diego State University Research Foundation, San Diego, CA (US)

( * ) Notice: Subject to any disclaimer, the term of this patent is extended or adjusted under 35 U.S.C. 154(b) by 342 days.

(21) Appl. No.: 16/621,797

(22) PCT Filed: Jun. 12, 2018

(86) PCT No.: PCT/US2018/037119
§ 371 (c)(1),
(2) Date: Dec. 12, 2019

(87) PCT Pub. No.: WO2018/231838
PCT Pub. Date: Dec. 20, 2018

(65) Prior Publication Data
US 2020/0172587 A1  Jun. 4, 2020

Related U.S. Application Data

(60) Provisional application No. 62/518,335, filed on Jun. 12, 2017.

(51) Int. Cl.
| | | |
|---|---|---|
| *C07K 14/47* | (2006.01) | |
| *A61K 9/00* | (2006.01) | |
| *A61K 38/17* | (2006.01) | |
| *A61P 35/00* | (2006.01) | |
| *A61P 37/04* | (2006.01) | |

(52) U.S. Cl.
CPC .......... *C07K 14/472* (2013.01); *A61K 9/0019* (2013.01); *A61K 38/1725* (2013.01); *A61P 35/00* (2018.01); *A61P 37/04* (2018.01)

(58) Field of Classification Search
None
See application file for complete search history.

(56) References Cited

U.S. PATENT DOCUMENTS

| | | |
|---|---|---|
| 5,696,230 A | 12/1997 | Sanderson et al. |
| 5,942,599 A | 8/1999 | Sanderson et al. |
| 6,821,517 B1 | 11/2004 | Sanderson et al. |
| 9,895,411 B2 | 2/2018 | Sanderson et al. |
| 10,220,002 B2 | 3/2019 | Vetro et al. |
| 10,363,282 B2 | 7/2019 | Sanderson et al. |
| 2011/0092446 A1 | 4/2011 | Francois et al. |
| 2011/0190214 A1* | 8/2011 | Maione ..................... A61P 1/00 514/17.7 |
| 2015/0297668 A1* | 10/2015 | Sanderson .............. A61P 31/04 424/185.1 |

FOREIGN PATENT DOCUMENTS

| | | |
|---|---|---|
| WO | 199211858 | 7/1992 |
| WO | 2016145365 | 9/2016 |

OTHER PUBLICATIONS

International Search Report and Written Opinion in corresponding PCT/US2018/037119, dated Sep. 17, 2018.
Kollessery, et al., "Tumor-specific peptide-based vaccines containing the conformationally biased, response-selective C5a agonists EP54 and EP67 protect against aggressive large B cell lymphoma in a syngeneic murine model", Vaccine 29 (2011) 5904-5910.
Karuturi, et al., "Encapsulation of an EP67-conjugated CTL peptide vaccine in nanoscale biodegradable particles increases the efficacy of respiratory immunization and affects the magnitude and memory subsets of vaccine-generated mucosal and systemic CD8+ T cells in a diameter-dependent manner", Mol Pharm. May 1, 2017; 14(5):1469-1481.
Supplementary Search Report in corresponding European Patent Application Serial No. 18817461.9, dated Feb. 16, 2021.
Duryee, et al., "Immune responses to methamphetamine by active immunization with peptide-based, molecular adjuvant-containing vaccines", Vaccine, 2009, 27(22), 2981-2988.
Karuturi, et al., "Preliminary evidence that the novel host-derived immunostimulant EP67 can act as a mucosal adjuvant", Clinical Immunology, 2015, 161(2), 251-259.

* cited by examiner

*Primary Examiner* — Ronald T Niebauer
(74) *Attorney, Agent, or Firm* — Hovey Williams LLP; Crissa A. Cook

(57) ABSTRACT

Hydrochloride salt forms of synthetic C-terminal peptide analogs of C5a, which are response selective agonists of C5aR-bearing antigen presenting cells. Methods of inducing an immune response in a subject by administering such peptide analogs alone or in combination with other active agents are also disclosed.

25 Claims, 3 Drawing Sheets

Specification includes a Sequence Listing.

EP67: Tyr-Ser-Phe-Lys-Asp-Met-Pro-(N-methyl-Leu)-D-Ala-Arg (SEQ ID NO:2)
1-11: Tyr-Ser-Phe-Lys-Asp-Met-X-(N-methyl-Leu)-D-Ala-Arg (SEQ ID NO:1)

HYDROCHLORIDE SALTS OF C5A RECEPTOR AGONIST PEPTIDES

CROSS-REFERENCE TO RELATED APPLICATIONS

The present application is the U.S. National Stage of International Patent Application No. PCT/US2018/037119, filed Jun. 12, 2018, which claims the priority benefit of U.S. Provisional Patent Application Ser. No. 62/518,335, filed Jun. 12, 2017, entitled HYDROCHLORIDE SALTS OF C5A RECEPTOR AGONIST PEPTIDES, each of which is incorporated by reference in its entirety herein.

FEDERALLY SPONSORED RESEARCH OR DEVELOPMENT

This invention was made with Government support under R41 AI094710 and R01 AI125137 awarded by the National Institutes of Health. The Government has certain rights in the invention.

SEQUENCE LISTING

The following application contains a sequence listing in computer readable format (CRF), submitted as a text file in ASCII format entitled "Sequence_Listing_49770-PCT" created on June 11, 2018, as 8 KB. The content of the CRF is hereby incorporated by reference.

BACKGROUND OF THE INVENTION

Field of the Invention

The present invention relates to HCl salt forms of bioactive peptides, and particularly response selective C-terminal analogs of C5a.

Description of Related Art

The blood complement (C) plays an important role in host defense to foreign substances. Individuals that are deficient in certain C components often suffer recurrent and sometimes fatal infections, Activation of the C system results in the production of the anaphylatoxins, C3a and C5a. These fragments are biologically active cleavage products of the larger C proteins C3 and C5, respectively. C5a is a short (74 residues in human) glycoprotein that is generated by enzymatic cleavage of C5.

C5a is recognized as a principal mediator of local and systemic inflammatory responses because of its ability to activate and recruit neutrophils, induce spasmogenesis, increase vascular permeability and stimulate the release of secondary inflammatory mediators from a variety of cell types (e.g., leukocytes and macrophages). C5a also plays a role in the modulation of innate and acquired immune responses because of its ability to engage and activate antigen presenting cells (APCs) to induce, directly or indirectly, the synthesis and release of the cytokines such as interleukin-1 (IL-1), interleuken-6 (IL-6), interleukin-8 (IL-8), interleuckin-12 (IL-12), and tumor necrosis factor-α (TNF-α) and enhance the antigen processing and presentation capacity of these APCs. These inflammatory and immunomodulatory activities are believed to be expressed via a transmembrane, G-protein-mediated signal transduction mechanism when the C5a ligand interacts with its receptor (s) expressed on the surface of certain circulating and tissue cell types. The pro-inflammatory activities of C5a may be classified into two broad categories. The first category of activity (class 1) is generally associated with the release of histamines and other secondary mediators (e.g., vasoconstrictor and vasodilator eicosanoids). These activities of C5a affect many systems, and are associated with the phenomena of spasmogenesis and certain cell aggregatory activities (e.g., platelet aggregation). The second category of activity (class 2) involves recruitment and activation of neutrophils and subsequent effects of such neutrophil accumulation and activation, such as increased vascular permeability, release of cytokines and other pro-inflammatory responses. Because of its pro-inflammatory activity, C5a has been implicated as a pathogenic factor in the expression of certain inflammatory disorders, such as rheumatoid arthritis, adult respiratory distress syndrome, gingivitis, and the tissue damage associated with atherosclerosis and myocardial infarction. Consequently, considerable research efforts have been expended in developing specific C5a antagonists for use as anti-inflammatory agents in the treatment of these diseases. However, most literature relating to C5a receptor agonists and antagonists fail to differentiate between C5a receptors on C5a receptor-bearing macrophages and C5a receptors on C5a receptor-bearing granulocytes. Thus, there has been little appreciation in the art for selectively binding/activation of one type of C5a receptor over another.

U.S. Pat. Nos. 5,696,230 and 5,942,599 describe a conformational characterization of C-terminal peptide analogs of human C5a. U.S. Pat. No. 6,821,517 describes compositions and methods for delivering specific antigens to APCs via the unique C5aR, that is expressed on these APCs that differs from the C5aR expressed on inflammatory granulocytes. Co-pending U.S. 2012/0314839, filed Nov. 30, 2012 and U.S. 2015/0297668, filed Jun. 29, 2011, demonstrate advantages of selectively binding C5a receptor-bearing APCs, but not binding C5a receptor-bearing neutrophils. Each of the foregoing patents and pending applications is incorporated by reference in its entirety herein except to the extent inconsistent with the present disclosure

SUMMARY OF THE INVENTION

The present invention is broadly concerned with hydrochloride (HCl) salt forms of bioactive peptides, and particularly C-terminal analogs of C5a. An exemplary C-terminal analog of C5a designated as EP67 (SEQ II NO:2), has been demonstrated as an effective selective agonist for C5a receptor-bearing APCs. According to convention, uppercase letters designate the L stereoisomeric form and lower case the D stereoisomeric form of the amino acids; (MeL) corresponds to N-methyl leucine. EP67 and related analogues possess potent immune-enhancing properties. EP67 is described in detail in U.S. 2012/0314839, filed Nov. 30, 2012 and U.S. 2015/0297668, filed Jun. 29, 2011, incorporated by reference herein. The biologically compatible HCl salt form of the bioactive peptide EP67 displays enhanced efficacy and quicker acquisition to maximum potency than the trifluoroacetate (TFA) and acetate salt forms. HCl salt forms of conformationally-stable analogs of EP67 are also contemplated herein. These conformationally-stable peptides comprise, consist essentially, or consist of the formula:

(SEQ ID NO: 1)
Tyr-Ser-Phe-Lys-Asp-Met-Xaa-(Xaa2)-(D-Ala)-Arg, wherein Xaa is a modified proline residue or a residue substitution for proline, and Xaa2 is leucine or N-methyl leucine. The modified proline residue, when used, is one that lacks the cis/trans isomerization of unmodified proline. Advantageously, these peptides have a fixed conformation and selective C5a receptor binding activity. Such conformationally-stable analogs of EP67 are described in detail in co-pending WO 2016/0145365, filed Mar. 11, 2016, and the details of such analogs are incorporated by reference herein in their entirety. Unlike the naturally flexible C5structure, these peptide analogs are modified to be constrained in a rigid (specific) conformation, contributing to their specificity for C5aR-bearing APCs. Moreover, because cis/trans isomerization is avoided, the inventive peptides are even more constrained in terms of their 3-dimensional binding structure than EP67.

According to one or more embodiments of the invention, exemplary peptide analogs include EP67 (where Xaa is P and Xaa2 is MeL, SEQ ID NO:2), EP144 (where Xaa is 2-aminoisobutyric acid and Xaa2 is MeL, SEQ ID NO:3), or EP145 (where Xaa is 5,5'-dimethylproline and Xaa2 is MeL, SEQ ID NO:4), which are depicted in FIG. 1. Other possible residue substitutions for the proline residue in EP7 are shown in FIG. 2, including 2-aminoadamantane-2-carboxylic acid, 2-azabicyclo[2.1.1]hexane-1-carboxylic acid, octahydro-W-indole-2-carboxylic acid, 2-azaspiro[3.3] hepane-6-carboxylic acid, piperidine-4-carboxylic acid, and L-cyclohexylalanine. Further residue substitutions for the proline residue in EP67 are shown in FIG. 3, including pipecolic acid, 2-azetidinecarboxylic acid, among others shown.

In one or more embodiments, exemplary replacement residues for the proline residue of EP67 (Xaa) include alanine; eucine; isoleucine; N-methylalanine; 2-aminoisobutyric acid; 3-aminoisobutyric acid; N-methylisoleucine; singly-substituted proline analogs at the 2, 3, 4, and/or 5 positions of the pyrrolidine side chain; doubly-substituted proline analogs at the 2, 3, 4, and/or 5 positions of the pyrrolidine side chain; pseudoproline analogs: cysteine-derived thiazolidine, serine-derived oxazolidine, or threonine -derived oxazolidine; trifluoromethylated pseudoprolines; proline analog or homolog having a constrained conformation; trifluoromethyiated azetidine 2-carboxylic acid; trifluoromethylated homoserine; oxetanyl-containing peptidomimetic; N-aminoimidazolidin-2-one analog; and nonchiral pipecolic acid analogs. Exemplary singly- or doubly-substituted substituted proline analogs include 5,5'-dimethylproline, 2,4-methano-P-proline, or 2,5-ethano-P-proline. Exemplary serine/threonine/cysteine-derived pseudoproline analogs are selected from the group consisting of:

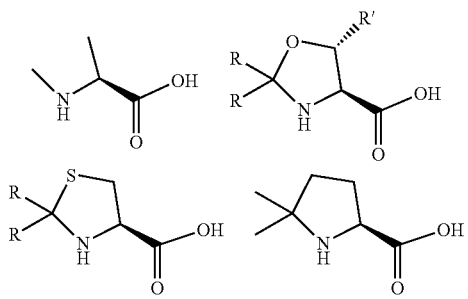

where R and R'=H or CH₃. Exemplary nonchiral pipecolic acid analogs are selected from the group consisting of:

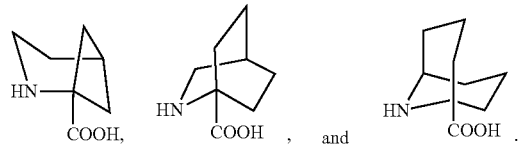 [SMILES: O=C(O)C12CC(CCN1)C2 ; O=C(O)C12CCC(CC1)CN2 ; O=C(O)CCCC1CCCCN1]

Exemplary N-aminoimidazolidin-2-one analogs are selected from the group consisting of N-amino-imidazolidinone, α-amino-γ-lactam, and an azapeptide.

Additional C-terminal analogs of C5a are also contemplated herein, including those comprising, consisting essentially, or consisting of the formula:

(SEQ ID NO: 5)
A1-Ser-The-Lys-A2-A3-A4-A5-A6-A7 wherein: Al is Tyr, Trp, or N-acetyl derivatives of Tyr or Trp; A2 is Asp, Gly, Pro or N-methyl derivatives of Asp or Gly; A3 is Ala, Cys, Leu, Met or N-methyl derivatives of Ala, Cys, Leu or Met; A4 is Gin, Leu, Pro or N-methyl derivatives of Gin or Leu; A5 is Pro, Leu, α-methyl Leu or N-methyl Leu; A6 is D-Ala, City, D-Pro, aminoisobutyric acid (Aib) or N-methyl derivatives of D-Ala or Gly; and A7 is Arg or N-methyl Arg; such as peptides selected from the group consisting of:

```
                                        (SEQ ID NO: 6)
Tyr-Ser-Phe-Lys-Pro-Met-Pro-Leu-(D-Ala)-Arg;

(SEQ ID NO: 7)
Tyr-Ser-Phe-Lys-Asp-Ala-Pro-Leu-(D-Ala)-Arg;

(SEQ ID NO: 8)
Tyr-Ser-Phe-Lys-Asp-Met-Pro-Leu-(D-Ala)-Arg;

(SEQ ID NO: 9)
Tyr-Ser-Phe-Lys-Asp-Met-Pro-Leu-Gly-Arg;

(SEQ ID NO: 10)
Tyr-Ser-Phe-Lys-Asp-Ala-Pro-Leu-Gly-Arg ;

(SEQ ID NO: 11)
Tyr-Ser-Phe-Lys-Asp-Cys-Pro-Leu-Gly-Arg;

(SEQ ID NO: 12)
Tyr-Ser-Phe-Lys-Asp-Met-Pro-Leu-(D-Pro)-Arg;

(SEQ ID NO: 13)
Tyr-Ser-Phe-Lys-Asp-Met-Gln-Leu-(D-Ala)-Arg;

(SEQ ID NO: 14)
Tyr-Ser-Phe-Lys-Asp-Met-Gln-Leu-Gly-Arg;

(SEQ ID NO: 15)
Tyr-Ser-Phe-Lys-Asp-Met-Gln-Pro-Gly-Arg;

(SEQ ID NO: 16)
Tyr-Ser-Phe-Lys-Asp-Met-Pro-Leu-Aib-Arg;

(SEQ ID NO: 17)
Tyr-Ser-Phe-Lys-Gly-Met-Pro-Leu-Gly-Arg;
and (SEQ ID NO: 18)
Tyr-Ser-Phe-Lys-Gly-Leu-Leu-Leu-Gly-Arg.
```

According to one aspect of the present invention, peptides according to various embodiments of the invention selectively elicit an immune response. In particular, the HCl salt form of the peptide analogs selectively binds and activates APCs without directly engaging/binding C5a receptor-bearing cells involved in pro-inflammatory activities of C5a (class 1 or class 2). Thus, the peptide analogs are selective agonists of C5aR-bearing APCs. In binding C5aR on APCs, the peptides activate the subject's innate immune system, which can be used to induce a non-specific immune response in the subject. The non-specific immune response can be used in the treatment of microbial infections, as well as non-infectious diseases, such as cancer and the like, discussed herein.

Likewise, in some aspects, the selectivity of these HCl salt form C5a receptor agonist peptides can be used to target a specific immunogenic agent to the APCs by functionally linking an HCl salt form peptide analog to a particular immunogen (e.g., antigen). When the peptide binds to the APC, the linked immunogen is internalized by the APC and generates an immune response that is specific to that immunogen. This APC-targeting utilization of peptides is described in more detail in U.S. Pat. No. 6,821,517, incorporated by reference herein.

In a further aspect, the present disclosure is also concerned with compositions comprising the inventive HCl salt form peptide analogs dispersed in a pharmaceutically acceptable carrier.

Also described herein are methods of inducing an immune response against infection via the selective engagement and activation of C5aR-bearing APCs in a subject. The methods generally comprise administering to the subject a therapeutically-effective amount of the inventive HCl salt form peptide analogs, which are response selective C5a agonists and have selective C5a receptor binding activity.

According to one aspect, the present disclosure is also concerned with kits comprising the inventive HCl salt form peptide analogs and instructions for administering the peptide(s) to a subject in need thereof.

Uses of the inventive HCl salt form peptide analogs are also described herein. In one aspect, the peptides are used to prepare a therapeutic or prophylactic medicament for inducing an immune response against an infection in a subject.

Peptides having the conformations and comprising the formulae set forth herein are high-potency C5a analogs that can selectively elicit different classes of biological responses associated with natural C5a. These high-potency analogs may be used as agonists to selectively elicit desired immunologic responses associated with natural C5a, and will find broad utility in treating immunocompromised patients, preferably without inflammatory side effects.

DETAILED DESCRIPTION

Figure 1:
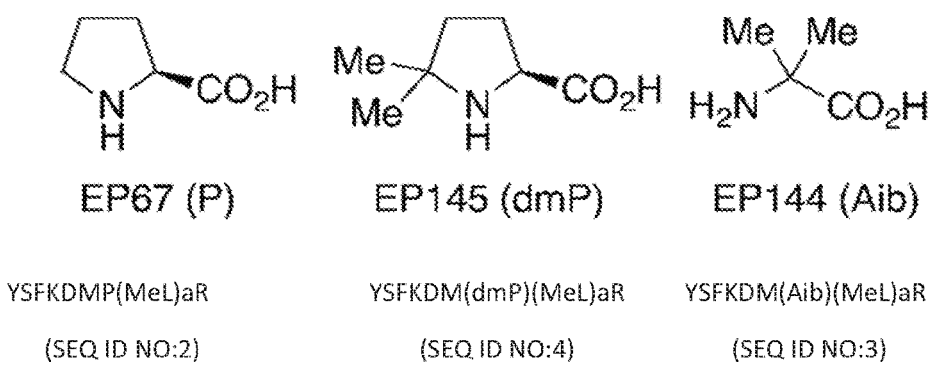
FIG. 1 shows the structure of residue substitutions options for residue 7 in SEQ ID NO:1, with name designations for preferred peptides.
Figure 2:
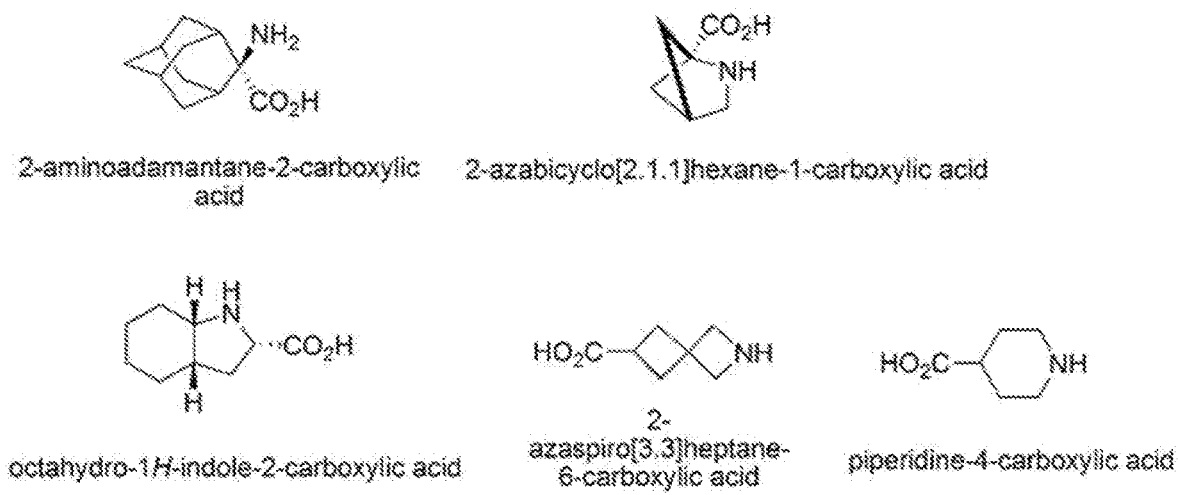
FIG. 2 shows additional residue substitutions for peptide analogs.
Figure 2:
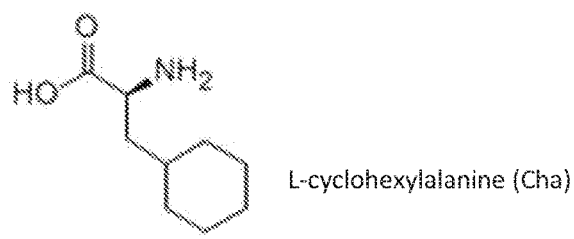
Figure 3:
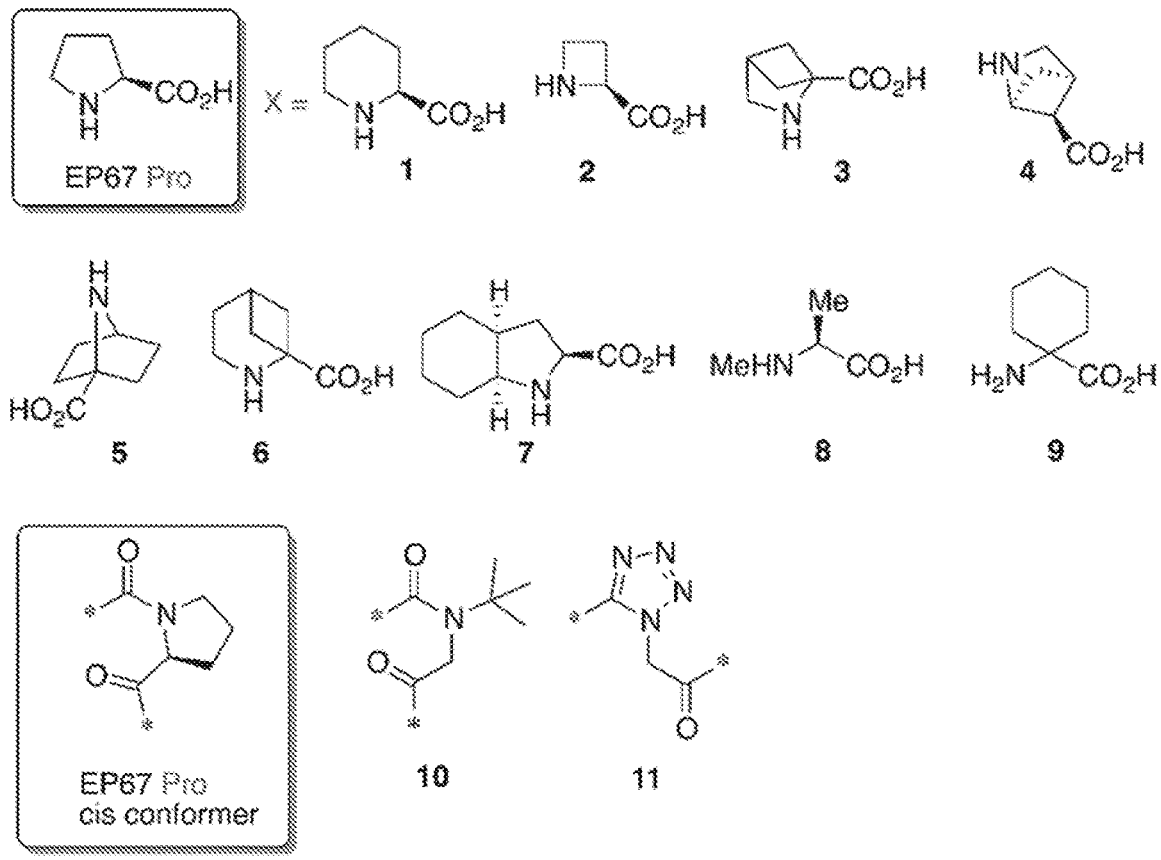
FIG. 3 shows EP67 (proline substitution at position 7) and additional alternative residue substitutions.

The biologically compatible HCl salt form of C5a analogs, such as EP67, displays improved efficacy/potency and kinetics as compared to the corresponding trifluoroacetate and acetate salt forms, which are commonly generated and used biologically. Also, the HCl salt does not display any decrease in solution stability relative to the trifluoroacetate and acetate salt forms. These results greatly strengthen the therapeutic potential and value of EP67 and related analogs, and lend considerable support for accommodating the regulatory requirements and translation into a commercial product.

The present invention is broadly concerned with a class of novel oligopeptide products capable of eliciting favorable immune outcomes through selective activation of C5a receptor-bearing APCs (e.g., macrophages, monocytes, dendritic cells), in the absence of triggering harmful inflammatory responses. In other words, the peptides selectively bind C5a receptor-bearing APCs, without binding pro-inflammatory granulocytes. The present invention relates to materials and methods for treating and preventing infectious and non-infectious disease. More specifically, the present disclosure relates to these new HCl salt form C5a receptor agonist peptides, and uses thereof for treating and preventing infectious and non-infectious disease.

These C5a receptor agonist peptides are capable of selectively inducing innate host immune responses at the expense of inflammatory responses and thus, can be used to treat a variety of diseases including, but not limited to, microbial infections such as viral, bacterial and fungal infections; and also non-infectious diseases including, but not limited to, cancer, immune related disorders, and inflammatory disorders.

The HCl salt form C5a receptor agonist peptides described in this invention can also be used to selectively induce acquired immune responses when coupled with an immunogenic agent, which can then be targeted directly to APCs through the specific binding of the peptides. In one or more embodiments, the HCl salt form peptide analogs are covalently linked to the immunogenic agent (optionally via a spacer moiety), whereby binding of the peptide to an APC C5a receptor activates the antigen presenting cell, effecting delivery of the immunogenic agent to an antigen presenting pathway of the APC. Thus, these HCl salt form receptor agonists are useful as molecular vaccine adjuvants to enhance the efficacy and immune stimulating properties of various types of vaccines. Exemplary immunogenic agents are components that resemble a disease-causing microorganism or infectious agent, and/or are made from weakened or killed forms of the same, its toxins, subunits, particles, and/or one of its surface proteins, such that it provokes an immune response in the host specific to that microorganism or infectious agent. Some vaccines contain killed, but previously virulent, microorganisms that have been destroyed. Examples include influenza, cholera, polio, hepatitis A, and rabies vaccines. Some vaccines contain live, attenuated microorganisms (modified live virus). These vaccines use live viruses that have been cultivated under conditions that disable their virulent properties, or closely related but less dangerous organisms to produce a broad immune response. Some are also bacterial in nature. Live vaccines typically provoke more durable immunological responses and in humans are the preferred type for healthy adults. Examples include measles, mumps, rubella, whooping cough, and the like. Toxoid vaccines are made from inactivated toxic compounds that cause illness rather than the microorganism itself. Examples of toxoid-based vaccines include tetanus and diphtheria. Protein subunit vaccines can also be used. In these vaccines, a fragment of the microorganism is used to create an immune response. Examples include subunit vaccines against HPV, hepatitis B, and the hemagglutinin and neuraminidase subunits of the influenza virus. Vaccines can also be formulated using viral or bacterial DNA to provoke an immune response. Furthermore, although most current vaccines are created using inactivated or attenuated compounds from microorganisms, synthetic vaccines using synthetic peptides, carbohydrates, or antigens can also be used. Cancer vaccines using tumor-specific antigens are also contemplated herein. Suitable vaccines can be monovalent or polyvalent.

The methods described in this invention can also be applied to other peptide or protein molecules to enhance or modulate the efficacy of these molecules.

The HCl salt form C5a receptor agonist peptides are used to induce innate and acquired immune responses while sparing inflammation. Advantageously, the present invention allows for the use of a lower therapeutic dose with increased CSaR binding affinity on APCs, and bioselectivity, thereby preventing side effects resulting from the non-binding analog conformer.

Compositions comprising the HCl salt form C5a receptor agonist peptides are also described herein. In various embodiments, the composition comprises a pharmaceutically acceptable carrier. The term carrier is used herein to refer to diluents, excipients, vehicles, coatings and the like, in which the peptide(s) may be dispersed or coated with for administration. Suitable carriers will be pharmaceutically acceptable. As used herein, the term "pharmaceutically acceptable" means not biologically or otherwise undesirable, in that it can be administered to a subject without excessive toxicity, irritation, or allergic response, and does not cause unacceptable biological effects or interact in a deleterious manner with any of the other components of the composition in which it is contained. A pharmaceutically-acceptable carrier would naturally be selected to minimize any degradation of the compound or other agents and to minimize any adverse side effects in the subject, as would be well known to one of skill in the art. Pharmaceutically-acceptable ingredients include those acceptable for veterinary use as well as human pharmaceutical use, and will depend on the route of administration. Any carrier compatible with the excipient(s) and EP67 analogs can be used. Supplementary active compounds may also be incorporated into the compositions.

A composition of the present disclosure is formulated to be compatible with its intended route of administration. Examples of routes of administration include oral administration (ingestion) and parenteral administration, e.g., intravenous, intradermal, subcutaneous, inhalation, nasal, transdermal (topical), transmucosal, buccal, sublingual, pulmonary and rectal administration.

Pharmaceutical compositions suitable for injectable use include aqueous solutions (where water-soluble), solutions in sterile isotonic aqueous buffer, or dispersions and sterile powders for the extemporaneous preparation of sterile injectable solutions or dispersion. For intravenous administration, suitable carriers include physiological saline, Cremophor EL™ (BASF, Parsippany, N.J.), bacteriostatic/sterile water/distilled autoclaved water (DAW), or phosphate buffered saline (PBS). In all cases, the composition is sterile and fluid to allow syringability. The carrier may be a solvent or dispersion medium containing, for example, water, ethanol, polyol (for example, glycerol, propylene glycol, and liquid polyethylene glycol, and the like), and suitable mixtures thereof. Fluidity is maintained, for example, by the use of a coating such as lecithin, by the maintenance of the required particle size in the case of dispersion, and by the use of surfactants. Prevention of the action of microorganisms may be achieved by various antibacterial and antifungal agents, for example, parabens, chlorobutanol, phenol, ascorbic acid, thimerosal, and the like. In many cases, it will be preferable to include isotonic agents, for example, sugars, polyalcohols such as mannitol, sorbitol, and sodium chloride in the composition. Prolonged absorption of the injectable compositions may be brought about by including in the composition an agent that delays absorption, for example, aluminum monostearate and gelatin. The injectable preparations may be enclosed in ampules, disposable syringes or multiple dose vials made of glass or plastic.

Solutions or suspensions used for parenteral application (injection or infusion) may include the following components: a sterile diluent such as water for injection, saline solution, fixed oils, polyethylene glycols, glycerin, propylene glycol, various oil-in-water or water-in-oil emulsions, as well as dimethyl sulfoxide (DMSO), or other synthetic solvents; antibacterial agents such as benzyl alcohol or methyl parabens; antioxidants such as ascorbic acid or sodium bisulfate; chelating agents such as ethylenediaminetetraacetic acid; buffers such as acetates, citrates or phosphates and agents for the adjustment of tonicity such as sodium chloride or dextrose. The pH may be adjusted with acids or bases, such as hydrochloric acid or sodium hydroxide.

Oral compositions generally include an inert diluent or an edible carrier. Oral formulations generally take the form of a pill, tablet, capsule (e.g., soft gel capsule, solid-filled capsule, or liquid-filled capsule), solid lozenge, liquid-filled lozenge, mouth and/or throat drops or spray, effervescent tablets, orally disintegrating tablet, suspension, emulsion, syrup, elixir, or tincture. The composition may be contained in enteric forms to survive the stomach or further coated or mixed to be released in a particular region of the gastrointestinal tract by known methods. Solid oral dosage forms are typically swallowed immediately, or slowly dissolved in the mouth. Oral compositions may also be prepared using a fluid carrier for use as a mouthwash, wherein the compound in the fluid carrier is applied orally and swished and expectorated or swallowed. Oral formulations optionally contain any of the following ingredients, or compounds of a similar nature: a binder such as microcrystalline cellulose, gum tragacanth or gelatin; starch or lactose; a disintegrating agent such as alginic acid, Primogel™, or corn starch; a lubricant such as magnesium stearate; a glidant such as colloidal silicon dioxide; and/or a sweetening agent such as sucrose or saccharin.

For administration by inhalation, the composition is optionally delivered in the form of a spray. The spray may be an aerosol spray from a pressured container or dispenser, which contains a suitable propellant, e.g., a gas such as carbon dioxide, or a nebulizer. The composition is optionally formulated for delivery via a dry powder inhaler (DPI), a metered dose inhaler (pMDI), nasal spray, or a vaporizer. For routes of administration involving absorption of an agent and/or excipient through mucosal membrane, the composition further optionally comprises a penetrant.

Optionally, the composition is formulated as a "liquid respiratory composition," i.e., a composition in a form that is deliverable to a mammal via the oral cavity, mouth, throat, nasal passage or combinations thereof. These compositions can be delivered by a delivery device selected from droppers, pump, sprayers, liquid dropper, spoon, cup, squeezable sachets, power shots, and other packaging and equipment, and combinations thereof. In one embodiment, the liquid respiratory composition comprises the therapeutic agent, and excipient, a thickening polymer (e.g., xanthan gum, cellulosic polymers such as carboxymethycellulose (CMC), hydroxethylcellulose, hydroxymethylcellulose, and hydroxypropylmethylcellulose, carrageenan, polyacrylic acid, cross-linked polyacrylic acid such as Carbopol®, polycarbophil, alginate, clay, and combinations thereof), and optionally a mucoadhesive polymer (e.g., polyvinylpyrrolidone (Povidone), methyl vinyl ether copolymer of maleic anhydride (Gantrez®), guar gum, gum tragacanth, polydextrose, cationic polymers, poly(ethylene oxide), poly(ethylene glycol), polyvinyl alcohol), poly(acrylic acid), cross-linked polyacrylic acid such as Carbopol®, polycarbophil, poly(hydroxyl ethyl methacrylate), chitosan, cellulosic polymers such as carboxymethycellulose (CMC), hydroxethyl cellulose, hydroxymethylcellulose, and hydroxypropylmethylcellulose, and combinations thereof). The composition is preferably a non-Newtonian liquid that exhibits zero shear viscosity from about 100 centiPoise (cP) to about 1,000,000 cP, from about 100 cP to about 500,000 cP, from about 100 cP to about 100,000 cP, from about 100 cP to about 50,000 cP, from about 200 cP to about 20,000 cP, from about 1,000 to about 10,000 cP at a temperature of about 37 ° C., as measured according to the Shear Viscosity Method. The pH range of the formulation is generally from about 1 to about 7, from about 2 to about 6.5, and from about 4 to about 6.

In general additional pharmaceutically-acceptable ingredients for use in the compositions include adjuvants, antigens, buffering agents, salts, stabilizing agents, diluents, preservatives, antibiotics, isotonic agents, cell media (e.g., MEM, FBS), flavoring agents, and the like. Exemplary isotonic agents include dextrose, lactose, sugar alcohols (e.g., sorbitol, mannitol), and the like. Stabilizing agents include sugars such as sucrose and lactose, amino acids such as glycine or the monosodium salt of glutamic acid and proteins such as albumin or gelatin, and mixtures thereof. Exemplary preservatives include formaldehyde, thimerosal, and the like.

In various embodiments, in addition to the carrier and peptide analogs described herein, a nasal spray formulation may comprise benzalkonium chloride, camphor, chlorhexidine gluconate, citric acid, disodium EDTA, eucalyptol, menthol, purified water, and/or tyloxapol. An exemplary oral composition may comprise FD&C Blue No. 1, gelatin, glycerin, polyethylene glycol, povidone, propylene glycol, purified water, sorbitol special, and/or titanium dioxide in addition to an excipient and acetaminophen, doxylamine succinate, and phenylephrine HCl (or dextromethorphan).

In various embodiments, powders, creams and gels are contemplated for topical administration of a pharmaceutical composition. In one embodiment, the topical administration refers to the application of a therapeutic composition to a localized area of the body or to the surface of a body part (e.g., on the skin) where action or symptom relief is desired. In one embodiment, a transdermal patch is used according the present disclosure. In still other embodiments, a pharmaceutical composition according to the present disclosure is embedded, e.g., in wound dressings, bandages (e.g., hydrocolloids, hydrogels, alginates, foams, gauze), and/or surgical sutures to prevent and/or treat infections and improve wound (e.g., scrapes, cuts, and surgical incisions) healing.

In one embodiment, the components of the composition are prepared with carriers that will protect the components against rapid elimination from the body, such as a controlled release formulation, including coatings, implants, and microencapsulated delivery systems. Biodegradable, biocompatible polymers may be used, such as ethylene vinyl acetate, polyanhydrides, polyglycolic acid, collagen, polyorthoesters, and polylactic acid.

The formulation is provided, in various aspects, in unit dosage form for ease of administration and uniformity of dosage. "Unit dosage form" as used herein refers to physically discrete units suited as unitary dosages for the subject to be treated, each unit containing a predetermined quantity of active compound calculated to produce the desired therapeutic effect in association with the required pharmaceutical carrier. The specification for the dosage unit forms are dictated by and are directly dependent on the unique characteristics of the excipient(s) and therapeutic agent(s) and the particular biological effect to be achieved.

Safety and efficacy of compositions described herein are determined by standard procedures using in vitro or in vivo technologies, such as the materials and methods described herein and/or known in the art. Administration may be on an as-needed or as-desired basis, for example, once-monthly, once-weekly, or daily, including multiple times daily, for example, at least once daily, from one to about ten times daily, from about two to about four times daily, or about three times daily. A dose of composition optionally comprises about from about 0,001 mg to about 1000 mg active agent, alternatively from about 2.5 mg to about 750 mg active agent, and alternatively from about 5 mg to about 650 mg of the active agent. In one embodiment, a dose of composition according to the present disclosure comprises about from 0.1 mg to about 0.25 mg. In various embodiments, a dose of composition according to the present disclosure comprises 25 µg, 50 µg, 60 µg, 70 µg, 80 µg, 90 µg, 100 µg, 125 µg, 150 µg, 175 µg, 200 µg, 225 µg, 250 µg, 275 µg, 300 µg, 325 µg, 350 µg, 375 µg, 400 µg, 425 µg, 450 µg, 475 µg or 500 µg. In various embodiments, a dose of composition according to the present disclosure comprises between 2.5 µg to 500 µg, 50 µg to 400 µg, 100 µg to 300 µg, or 200 µg to 250 µg.

In various embodiments, the HCl salt form C5a receptor agonist peptides or a pharmaceutical composition comprising the HCl salt form C5a receptor agonist peptides, is used in combination with one or more other active agents useful for treating or preventing infections or diseases. The other active agent(s) can enhance the effects of the therapeutic agent and/or exert other pharmacological effects in addition to those of the therapeutic agent. Non-limiting examples of active agents that can be used in combination with a therapeutic agent are immunosuppressants (e.g., cyclosporine, azathioprine), corticosteroids, anti-inflammatory agents, chemotherapeutic agents, antibiotics, antifungals, and antivirals.

As described herein, other exemplary active agents that are contemplated include vaccines existing vaccines directed to a specific pathogen or disease) and vaccines comprising C-terminal analogs of C5a conjugated to a specific antigen. For example, the antigen can be attached to the N-terminus of the C-terminal analog of C5a via two arginine linkers, which provide a cleavage site for proteolytic enzymes in the cytoplasm of the antigen presenting cell as a means of separating the antigen/epitope from the C-terminal analog of C5a and enhancing its processing and presentation in the context of MHC/HLA-I/II on the antigen presenting cell surface. For example, an exemplary swine Influenza A peptide cocktail vaccine could comprise one or more of the following immunogenic compositions:

NA (449-457; SEQ ID NO: 19):
NSDTVGWSW-[Arginine Linker]-[Peptide Analog]

NA (25-33; SEQ ID NO: 20):
QIGNIISIW-[Arginine Linker]-[Peptide Analog]

NA (266-274; SEQ ID NO: 21)):
SVEMNAPNY-[Arginine Linker]-[Peptide Analog]

NA (414-423; SEQ ID NO: 22):
GLDCIRPCFW-[Arginine Linker]-[Peptide Analog]

HA (87-95; SEQ ID NO: 23):
LSTASSWSY-[Arginine Linker]-[Peptide Analog]

HA (16-24; SEQ ID NO: 24):
NADTLCIGY-[Arginine Linker]-[Peptide Analog]

HA (445-454; SEQ ID NO: 25):
LLENERTLDY-[Arginine Linker]-[Peptide Analog]

Chemical conjugation approaches can also be used.

Figure 4:
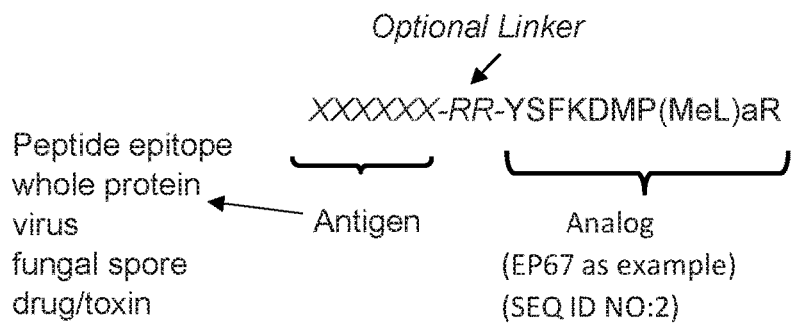
FIG. 4 illustrates an immunogenic compound comprising a peptide analog (e.g., EP67) conjugated via an arginine linker to an active agent.

The type of antigen that can be chosen as the antigenic moiety in the present invention can be any peptide, polypeptide or derivative thereof for which an immune response or antibody production is desired. These include but are not limited to, peptides, polypeptides (i.e. proteins) and derivatives thereof, such as glycopeptides, phosphopeptides and the like. Synthetic peptide and polypeptide derivatives or analogs, or any other similar compound that can be conjugated to a receptor-targeting moiety can be used in the present invention. Moreover, these peptides, proteins and derivatives may comprise single epitopes or multiple epitopes for generating different types of immune responses. Indeed, if an entire protein is conjugated to a targeting moiety, this protein is likely to comprise numerous epitopes, which may vary depending upon the solvent conditions and their effect on secondary and tertiary structure of the protein. Carbohydrates, nucleic acids and other non-protein substances also may be used as the antigenic moiety. Methods are available in the art for conjugating these substances to the peptide or protein targeting moiety, as generally illustrated in FIG. 4.

In one or more embodiments, the antigenic moiety comprises agents that are weakly antigenic or non-antigenic under currently available immunization conditions. Many tumor-associated antigens fall into this category, because the antigens also are expressed by normal cells. Therefore, immunological tolerance to such molecules makes it difficult to stimulate responses against such antigens. Other proteins that fall into this category include naturally occurring proteins from one species (e.g., human) for which it would be desirable to produce antibodies in another species but which are recalcitrant to antibody generation in the other species. The components can be made separately, then conjugated. For example, a small peptide analog, such as the above-described C5a agonist salt forms, may be produced by peptide synthetic methods, and conjugated to a protein which has been purified from naturally occurring biological sources. In particular, protein and/or peptide components of the invention are synthesized separately, then conjugated chemically using m-maleindobanzoyl-N-hydroxysuccinimide ester (MBF), This reagent cross-links amino- and carboxy-terminal thiol groups in the peptide with lysine side chains present in the protein. Alternatively, a synthetic peptide may be coupled to a protein using glutaraldehyde, a common cross-linking agent. Another method for chemically coupling a peptide to a protein is through the use of carbodiimide and 1-(3dimethylaminopropyl)-3-ethylcarbodiimide methiodide (EDC). Alternatively, proteins engineered for expression via recombinant methods may be used. Additionally, targeted antigens comprising peptide components (i.e., a peptide antigenic epitope conjugated to a peptide receptor ligand) can be synthesized in tandem by peptide synthetic chemistry according to known methods and as described in greater detail below. Likewise, targeted antigens of the invention comprising two larger polypeptide moieties (i.e., a large polypeptide antigen linked to a large ligand) can be made by recombinant techniques. For example, DNA molecules encoding both components can be ligated together by recombinant means, then expressed as the conjugated fusion protein.

The compositions described herein can be used as part of a treatment for a variety of diseases including, but not limited to, microbial infections such as viral, bacterial and fungal infections; these compositions can also be used to treat non-infectious diseases including, but not limited to, cancer, immune related disorders, and inflammatory disorders. The compositions described in this invention can also be used as vaccine adjuvants to enhance the efficacy and immune stimulating properties of various types of vaccines.

In use, a therapeutically-effective amount of HCl salt form C5a receptor agonist peptide is administered to a subject. Administration of the HCl salt form C5a receptor agonist peptide elicits an immune response in the subject, and more specifically a selective activation of the innate immune response, without direct activation of pro-inflammatory neutrophils and other granulocytes. The immune response will be demonstrated by a lack of observable clinical symptoms, or reduction of clinical symptoms normally displayed by an infected subject, faster recovery times from infection, reduced duration of infection, and the like. In another embodiment, a method of activating an immune cell at a site of infection or disease is provided comprising administering an effective amount of the HCl salt form C5a receptor agonist peptides to a mammal, said analog having selective C5a receptor binding activity. It will be appreciated that although the HCl salt form C5a receptor agonist peptide does not directly bind or activate the pro-inflammatory granulocytes, a secondary inflammatory response may be initiated due to the release of chemokines/cytokines by the APCs once activated by the peptide analogs.

In various aspects of each embodiment of the disclosure, the infection or disease is caused by an infectious agent selected from the group consisting of bacteria, virus, and fungus. In other various aspects of each embodiment, the disease is cancer. In various aspects of each embodiment of the method, the infection comprises a biofilm.

In various aspects of each embodiment of the disclosure involving a bacterial infection, such as mastitis, or infections caused by one or more bacteria such as methicillin-resistant *S. aureus* (MRSA), MRSA strain USA300-FPR3757, vancomycin-resistant *S. aureus* (VRSA), macrolide-resistant *S. pyogenes*, penicillin-resistant *Streptococcus pneumoniae*, Extensively Drug-Resistant *Mycobacterium tuberculosis* (XDR TB), multidrug-resistant *Enterococcus faecalis* multidrug-resistant *Enterococcus faecium*, *Pseudomonas aeruginosa*, clindamycin-resistant *Clostridium difficile*, fluoroquinolone-resistant *Clostridium difficile*, *Acinetobacter baumannii*, *Bacillus anthracis*, *Bordetella pertussis*, *Bordetella bronchiseptica*, *Borrelia burgdorferi*, *Brucella abortus*, *Brucella canis*, *Brucella melitensis*, *Brucella suis*, *Campylobacter jejuni*, *Chlamydia pneumonia*, *Chlamydia trachomatis*, *Chlamyclophila psittaci*, *Clostridium botulinum*, *Clostridium difficile*, *Clostridium perfringens*, *Clostridium tetani*, *Corynebacterium diphtheriae*, *Enterococcus faecalis*, *Enterococcus aecium*, *Ehrlichia canis*,

*Escherichia cob, Francisella tularensis, Haemophilus influenzae, Helicobacter Legionella pneumophila, Leptospira interrogans, Listeria monocytogenes, Mycobacterium leprae, Mycobacterium tuberculosis, Mycobacterium ulcerans, Mycoplasma pneumoniae, Neisseria gonorrhoeae, Neisseria meningitidis, Pseudomonas aeruginosa, Rickettsia ricketaii, Salmonella typhi, Salmonella typhimurium, Shigella sonnei, Staphylococcus aureus, Staphylococcus epidermidis, Staphylococcus saprophyticus, Streptococcus agalactiae, Streptococcus unions, Streptococcus pneumoniae, Streptococcus pyogenes, Treponema pallidum, Vibrio cholerae,* and/or *Yersinia pestis*.

In various aspects of each embodiment of the disclosure involving a viral infection, the virus is selected from the group consisting of Poxviridae, Chordopoxvirinae, (i)rthopoxvirus, Cowpoxvirus, Monkeypox virus, Vaccinia virus, Variola virus, Parapoxvirus, Bovine papular stomatitis virus, Porcine Epidemic Diarrhea virus (PEDv), Porcine Reproductive and Respiratory Syndrome Virus (PRRSV), Oft virus, bovine viral diarrhea virus (BVDV), Pseudocowpox virus, Molluscipoxvirus, Molluscum contagiosum virus, Yatapoxvirus, Tanapox virus, Yaba monkey tumor virus, Herpesviridae,Alphaherpesvirinae, Simplexvirus, Human herpesvirus 1, Herpes simplex virus 1, Human herpesvirus 2, Herpes simplex virus 2, Varicellovirus, Human herpesvirus 3, Varicella-zoster virus, Betaherpesvitinae, Cytomegalovirus, Human herpesvirus 5, Human cytomegalovirus, Roseolovirus, Human herpesvirus 6, Human herpesvirus 7, Gamrnaherpesvirinae, Lymphocryptovirus, Human herpesvirus 4, Epstein-Barr virus, Rhadinovirus, Human herpesvirus 8, Kaposi's sarcoma-associated herpesvirus, Adenoviridae, Mastadenovirus, Human adenovirus A, Human adenovirus B, Human adenovirus C, Human adenovirus D, Human adenovirus E, Human adenovirus F, Polyomaomaviridae, Polyomavirus, BK polyomavirus, Human polyomavirus, JC polyomavirus, Papillomaviridae, Alphapapillloma-virus, Human papillomavirus 2, Human papillomavirus 10, Human papillomavirus 6, Human papillomavirus 7, Human papillomavirus 16, Human papillomavirus 18, Human papillomavirus 26, Human papillomavirus 32, Human papillomavirus 34, Human papillomavirus 53, Human papillomavirus 54, Human papillomavirus 61, Human papillomavirus 1, Human papillomavirus cand 90, Betapapillomavirus, Human papillomavirus 5, Human papillomavirus 9, Human papillomavirus 49, Human papillomavirus cand 92, Human papillomavirus cand 96, Gammapapillomavirus, Human papillomavirus 4, Human papillomavirus 48, Human papillomavirus 50, Human papillomavirus 60, Human papillomavirus 88, Mupapillomavirus, Human papillomavirus 1, Human papillomavirus 63, Parvoviridae, Parvovirinae, Erythrovirus, B19 virus, Hepadnaviridae, Orthohepadnavirus, Hepatitis B virus, Retroviridae, Orthoretrovirinae, Deltaretrovirus, Primate T-lymphotropic virus 1, Primate T-lymphotropic virus 2, Lentivirus, Human immunodeficiency virus 1, Human immunodeficiency virus 2, Reoviridae, Orthoreovirus, Mammalian orthoreovirus, Orbivirus, African horse sickness virus, Changuinola virus, Corriparta virus, Orungo virus, Rotavirus, Rotavirus A, Rotavirus B, Mononegavirales, Filoviridae, Marburgvirus, Lake Victoria marburgvirus, Ebolvirus, Ivory Coast ebolavirus, Reston ebolavirus, Sudan ebolavirus, Zaire ebolavirus, Paramyxoviridae, Paramyxovirinae, Respirovirus, Human parainfluenza virus 1, Human parainfluenza virus 3, Morbillivirus, Measles virus, Edmonston virus, Rubulavirus, Human parainfluenza virus 2, Human parainfluenza virus 4, Mumps virus, Henipavirus, Hendravirus, Nipahvirus, Pneumovirinae, Pneumovirus, Human respiratory syncytial virus, Metapneumovirus, Human metapneumovirus, Rhabdoviridae, Vesiculovirus, Chandipura virus, Cocal virus, Isfahan virus, Piry virus, Vesicular stomatitis Alagoas virus, Vesicular stomatitis Indiana virus, Vesicular stomatitis New Jersey virus, Lyssavirus, Australian bat Lyssavirus, Rabies virus, Orthomyxoviridae, Influenzavirus A, Influenza A virus, swine influenza A, avian influenza (H5N1, H7N9), canine influenza viruses, equine influenza viruses, Influenzavirus B, Influenza B virus, Influenzavirus C, Influenza C virus, Bunyaviridae, Bunyavirus, Bunyamwera virus, Bwamba virus, California encephalitis virus, Guama virus, Oriboca virus, Oropouche virus, Hantavirus, Andes virus, Hantaan virus, Puumala virus, Seoul virus, Dobrava-Belgrade virus, Bayou virus, Black Creek Canal virus, New York virus, Sin Nombre virus, Nairovirus, Crimean-Congo hemorrhagic fever virus, Nairobi sheep disease virus, Phlebovirus, Rift Valley fever virus, Sandfly fever Naples virus, Arenaviridae, Arenavirus, Lassa virus, Lymphocytic choriomeningitis virus, Guanarito virus, Junin virus, Nilachupo virus, Sabin virus, Deltavirus, Hepatitis delta virus, Nidovirales, Coronaviridae, Coronavirus, Human coronavirus 229E, Human coronavirus OC43, Human enteric coronavirus, Severe acute respiratory syndrom coronavirus, Torovirus, Picornaviridae, Enterovirus, Human enterovirus A, Human enterovirus B, Human enterovirus C, Human enterovirus D, Poliovirus, Rhinovirus, Human rhinovirus A, Human rhinovirus B, Hepatovirus, Hepatitis A virus, Parechovirus, Human parechovirus, Caliciviridae, Norovirus, Norwalk virus, Sapovirus, Sapporo virus, Hepevirus, Hepatitis E virus, Astroviridae, Mamastrovirus, Human astrovirus, Togaviridae, Alphavirus, Chikungunya virus, O'nyong-nyong virus, Mayaro virus, Ross River virus, Barmah Forest virus, Sindbis virus, Ockelbo virus, Venezuelan equine encephalitis virus, Western equine encephalitis virus, Eastern equine encephalitis virus, Rubivirus, Rubella virus, Flaviviridae, Flavivirus, Kyasanur Forest disease virus, Omsk hemorrhagic fever virus, Powassan virus, Louping ill virus, Tickborne encephalitis virus, Dengue virus, Japanese encephalitis virus, Murray Valley encephalitis virus, St. Louis encephalitis virus, West Nile virus, Ilheus virus, Yellow fever virus, Apoi virus, Hepacivirus, Hepatitis C virus, GB virus B, GB virus A, Feline Leukemia Virus (FeLV), Feline Coronavirus (feline infectious peritonitis virus).

Infections having more than one viral or bacterial causative agent can also be treated with the inventive compounds, including mastitis, bovine respiratory disease (BRD, which is linked to Gram negative bacteria *Mannhehnia haemolytica, Pasteurella multocida,* and *Histophilus soinni,* as well as *Mycoplasma bovis*), distemper, and the like.

In various aspects of each embodiment involving a fungus, the fungus is selected from the group consisting of *C. albicans, A. umigates, A. flrtvus, A. clavatus, C. two OrillanS, C. laurentil, C. albidus, Z. gatti, H. capsulatum, P. provecti, S. chartarum, C. immitis* and *C. postadasii.*

In various aspects of each embodiment of the disclosure, the disease is selected from the group consisting of scrapie, bovine spongiform encephalopathy, transmissible mink encephalopathy, chronic wasting disease, feline spongiform encephalopathy, exotic ungulate encephalopathy, Creutzfeldt-Jakob disease, iatrogenic Creutzfeldt-Jakob disease, variant Creutzfeldt-Jakob disease, familial Creutzfeldt-Jakob disease, sporadic Creutzfeldt-Jakob disease, Gerstmann-Straussler-Scheinker syndrome, fatal familial insomnia, and Kuru.

To achieve a desired therapeutic outcome in a combination therapy, HCl salt form C5a receptor agonist peptides and other active agent(s) are generally administered to a subject in a combined amount effective to produce the desired therapeutic outcome (e.g., reduction or elimination of one or more symptoms). The combination therapy can involve administering the HCl salt form C5a receptor agonist peptides and the other active agent(s) at about the same time. Simultaneous administration can be achieved by administering a single composition that contains both the HCl salt form C5a receptor agonist peptides and the other active agent(s). Alternatively, the other active agent(s) can be taken separately at about the same time as a pharmaceutical formulation comprising the HCl salt form C5a receptor agonist peptides (i.e., sequentially). In either case, the active agent and HCl salt form. C5a receptor agonist peptides are considered to have been "co-administered."

In other alternatives, administration of the HCl salt form C5a receptor agonist peptides can precede or follow administration of the other active agent(s) by an interval ranging from minutes to hours. In embodiments where the HCl salt form C5a receptor agonist peptides and the other active agent(s) are administered at different times, the HCl salt form C5a receptor agonist peptides and the other active agent(s) are administered within an appropriate time of one another so that both the HCl salt form C5a receptor agonist peptides and the other active agent(s) can exert a beneficial effect (e.g., synergistically or additively) on the recipient. In some embodiments, the HCl salt form C5a receptor agonist peptide is administered to the subject within about 0.5-12 hours (before or after), or within about 0.5-6 hours (before or after), of the other active agent(s). In certain embodiments, the HCl salt form C5a receptor agonist peptide is administered to the subject within about 0.5 hour or 1 hour (before or after) of the other active agent(s).

A "booster" dose of HCl salt form C5a receptor agonist peptides or a pharmaceutical composition comprising HCl salt form C5a receptor agonist peptides, separately or in combination with another active agent as described above, is also contemplated by the present disclosure. A booster dose may be administered about 1 week, about 1 month, about 2 months, about 3 months, about 4 months, about 5 months, about 6 months, about 7 months, about 8 months, about 9 months, about 10 months, about 11 months, about 12 months, about 2 years, about 3 years, about 4 years, about 5 years, about 6 years, about 7 years, about 8 years, about 9 years, about 10 years, about 15 years, and about 20 years after an initial administration.

A kit comprising the HCl salt form C5a receptor agonist peptides is also disclosed herein. The kit further comprises instructions for administering the HCl salt form C5a receptor agonist peptides to a subject. The HCl salt form C5a receptor agonist peptides can be provided as part of a dosage unit, already dispersed in a pharmaceutically-acceptable carrier, or it can be provided separately from the carrier. The kit can further comprise instructions for preparing the HCl salt form C5a receptor agonist peptides for administration to a subject, including for example, instructions for dispersing the analog(s) in a suitable carrier.

It will be appreciated that therapeutic and prophylactic methods described herein are applicable to humans as well as any suitable animal, including, without limitation, dogs, cats, and other companion animals, as well as, rodents, primates, horses, cattle, pigs, etc. The methods can be also applied for clinical research and/or study.

As described herein, the ability to induce innate immunity in a non-antigen-specific method has advantages in that it affords induction of immune responses to a wide range of pathogens irrespective of the nature of the antigens these pathogens express. Thus, the ability to induce a protective immune response is not dependent upon reaction to a specific antigen expressed by a pathogen, but rather to the pathogen itself.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

General Definitions

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Thus, for example, the reference to a particular C-terminal analog of C5a is a reference to one such analog or a plurality of such analogs, including equivalents thereof. Also, the terms "at least one" and "one or more" have the same meaning and include one, two, three or more. The following terms, unless otherwise indicated, shall be understood to have the following meanings when used in the context of the present disclosure.

Examples provided herein, including those following "such as" and "e.g.," are considered as illustrative only of various aspects of the present disclosure and embodiments thereof, without being specifically limited thereto. Any suitable equivalents, alternatives, and modifications thereof (including materials, substances, constructions, compositions, formulations, means, methods, conditions, etc.) known and/or available to one skilled in the art may be used or carried out in place of or in combination with those disclosed herein, and are considered to fall within the scope of the present disclosure.

As used in the present disclosure, the term "treating" or "treatment" refers to an intervention performed with the intention of preventing the development or altering the pathology of a disease or infection. Accordingly, "treatment" refers to both therapeutic treatment and prophylactic or preventative measures. A therapeutic agent may directly decrease the pathology of a disease or infection, or render the disease or infection more susceptible to treatment by other therapeutic agents or, for example, the host's immune system. Treatment of patients suffering from clinical, biochemical, radiological or subjective symptoms of a disease or infection may include alleviating some or all of such symptoms or reducing the predisposition to the disease. Improvement after treatment may be manifested as a decrease or elimination of such symptoms. Thus, the compositions are useful in treating a condition by preventing the development of observable clinical symptoms from infection, and/or reducing the incidence or severity of clinical symptoms and/or effects of the infection, and/or reducing the duration of the infection/symptoms/effects.

"Infections" as used herein refers to any microbial invasion of a living tissue that is deleterious to the organism (host). Microbial infections may be caused by microorganisms, or "infectious agents," including a bacteria, virus, or fungus. Similarly, the term "disease" refers to any pathological condition and includes the overt presentation of symptoms (i.e., illness) or the manifestation of abnormal clinical indicators (e.g., biochemical indicators). Alternatively, the term "disease" refers to a genetic or environmental risk of or propensity for developing such symptoms or abnormal clinical indicators. An infection or disease is any condition that would benefit from treatment with a molecule according to the present disclosure. This includes chronic and acute disorders or diseases including those pathological conditions which predispose the mammal to the disorder in question.

As used herein, the phrase "effective amount" or "therapeutically effective amount" is meant to refer to a therapeutic or prophylactic amount of HCl salt form C5a receptor agonist peptide that would be appropriate for an embodiment of the present disclosure, that will elicit the desired therapeutic or prophylactic effect or response, including alleviating some or all of such symptoms of disease or infection or reducing the predisposition to the disease or infection, when administered in accordance with the desired treatment regimen. One of skill in the art recognizes that an amount may be considered therapeutically "effective" even if the condition is not totally eradicated or prevented, but it or its symptoms and/or effects are improved or alleviated partially in the subject. The therapeutically effective dosage of peptide may vary depending on the size and species of the subject, and according to the mode of administration.

References herein to a "conformation" of a peptide or a "conformer" refer generally to the range of geometric orientations/structures/molecular arrangements, and particularly geometric isomers, that a peptide may adopt at a given time. "Conformationally-stable" means that the peptide is generally fixed in a single geometric orientation/conformation/molecular arrangement and not prone to conversion/rotation to a different orientation. In other words, rotation of bonds (particularly between the cis and trans configurations) is restricted or eliminated in the conformationally-stable analogs. Individual residue may also have a "constrained conformation," which means that they do not undergo cis/trans isomerization.

The term "oligopeptide" refers to a peptide that is at least about 5 amino acids in length and less than 40 amino acids in length. In one embodiment of the present disclosure, the oligopeptide is from about 5 to about 10 residues in length. In one embodiment, the oligopeptide is a decapeptide (i.e., 10 amino acids in length).

As used herein, the term "carboxy-terminal" or "C-terminal" refers to the carboxy-terminus of C5a.

As used herein, the phrase having "selective C5a receptor binding activity" and similar expressions, refer to the ability of the HCl salt form C5a receptor agonist peptides to bind to CD88 to stimulate the immune-modulatory effect in antigen presenting cells, at the expense of other C5a-mediated inflammatory responses. In other words, binding causes, inter alia, activation of APCs, without directly binding or activating C5a receptor-bearing granulocytes.

As used herein, "concurrent" administration of two therapeutic agents does not require that the agents be administered at the same time or by the same route, as long as there is an overlap in the time period during which the agents are exerting their therapeutic effect. Simultaneous or sequential administration is contemplated ("co-administration"), as is administration on different days or weeks. "Prior" administration refers to administering an HCl salt form C5a receptor agonist peptide at some time before administering a second therapeutic active agent, irrespective of whether the two therapeutic agents are exerting a therapeutic effect together. Moreover, "following" administration refers to administering an HCl salt form C5a receptor agonist peptide at some time after administering a second therapeutic agent, irrespective of whether the two therapeutic agents are exerting a therapeutic effect together.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Example 1

Peptide Synthesis and Purification

Peptides were synthesized according to standard Faroe orthogonal solid-phase methodologies on an AAPPTEC (Advanced Automated Peptide Protein Technology, Louisville, Ky.) APEX 396 peptide synthesizer. Syntheses were performed on a 0.10 mmol scale on Arg-loaded Wang resins (0.30-0.40 meq/g, substitution, 100-200 mesh). $N^\alpha$-amino groups were protected with the base-labile 9-fluorenylmethyloxycarbonyl (Fmoc) group. Side-chain functional groups were protected as follows: Arg (Pbf or 2,2,4,6,7-pentamethyldihyrdobenzofuran-5-sulfonyl); Asp (Ot-butyl ester); Cys, Gin & His (Trt or trityl); Lys (Boc or t-butyloxycarbonyl); Ser & Tyr (t-butyl). Synthesis was initiated by the removal of the Ftnoc group on the Arg-Wang resin with 20% piperidine in DMF for 12 minutes to expose the free "N-amino group. Amide bond formation was accomplished by the in situ coupling of the next residue as an actvated ester of 2-(1H-benzotriazol-1-yl)-1,1,3,3-tetramethyluronium hexafluorophosphate (HBTU) made with an equivalent of HBTU and 10% excess of diisopropyl ethylarnine (DIEA). Peptide elongation was achieved by repeating this cycle of Fmoc deprotection followed by coupling with the HBTU ester of the next amino acid Disulfide bridge formation was accomplished by oxidation of the di-Cys(SH) peptide in dilute aqueous solution (0.1 mg/mL, pH 7.5) by $K_3Fe(CN)_6$. The course of disulfide formation was monitored by analytical HPLC. The solution was acidified to pH 3.5 and weakly basic cation exchange beads (Amberlite-HCl IRA-68, Sigma) were added to the solution to form a slurry. The slurry was stirred for 20 mins, filtered, and the clear solution frozen and lyophilized.

Side-chain deprotection and cleavage from the resin were achieved in a single step acidolysis reaction by stirring the peptide-resin in a solution of 10 mL trifluoroacetic acid (TFA) containing 0.75g phenol, 0.5 mL water, and 0.25 mL triisopropylsi lane for 1.5 hr at room temp. Free peptide was precipitated from this solution by adding excess cold diethyl ether. The mixture was filtered through a scintered glass Buchner funnel (medium porosity) and the peptide/resin washed twice with cold ether to remove the scavengers. The peptide was extracted by swirling the peptide/resin in the funnel with 20-30 ml aliquots of 10% acetic acid followed by filtration. The extraction aliquots were combined, frozen, and lyophilized to yield the powdered form of the crude peptide, Peptides were purified by preparative and analytical reverse-phase HPLC on a Waters DeltaPrep chromatography system. The crude peptide was dissolved in 40 mL of water or running buffer (TEAP) and filtered through a 0,45 um nylon filter. Twenty microliters (20 μL) of this solution was loaded onto an analytical column (Waters Symmetry $C_{18}$, 5 μm, 4.6×250 mm) and eluted with a linear gradient generated of triethylamine/phosphoric, acid (TEAP) buffer (0.5% triethylamine (v/v) and 0.5% phosphoric acid (v/v)), pH 2.3 (solvent system A) and 60% (v/v) acetonitrile in TEAP pH 2.3 (solvent system B). The gradient (15-45% B over 30 min., flow rate 1.5 mL/min.) was generated by a Waters PrepLC Controller module. The separation was monitored at 214 nm with a programmable absorbance detector (Waters 2487 Dual Absorbance Detector) and the peaks were recorded and integrated on a computer to obtain the analytical chromatogram and separation conditions of the crude peptide.

Once optimized, these same gradient conditions were used to purify the crude mixture on a preparative scale. The remainder of the crude peptide (up to 500 mg) was loaded onto a radially compressed preparative HPLC column loaded with four separate reverse phase $C_{18}$ Waters PrepPak cartridges (25×100 mm, 15 μm, 300 Å) packed with $C_{18}$-bonded silica, previously equilibrated with TEAP pH 2.3. The peptide was eluted as described above with the analytical run, but with a flow rate of 60 mL/min.

Generation of the HCl salt was accomplished by loading the single isolated peptide peak from the TEAP preparative run onto the same preparative column, but previously equilibrated with an aqueous solution of 5 mM HCl. The peptide was eluted with 5 mM HCl as the running buffer and a gradient of acetonitrile (0-50% over 5 minutes) at a flow rate of 60 mL/min. The purified HCl peptide salt was recovered by lyophilization. $^{31}$P-NMR results confirmed that there was no phosphate salt emanating from the triethylamine/phosphoric acid (TEAP) buffer used to purify (in place of conventional 0.1% TFA), and instead the presence of the HCl counter ion from the desalting process (5 mM HCl) after the TEAP purification.

Generation of the acetate salt (OAc) was accomplished by a procedure similar to the above, using 0.5% (v/v) acetic acid as the running buffer and acetonitrile as the eluent.

Generation of the TFA salt was likewise accomplished with 0.1% TFA as the running buffer and 60% acetonitrile in 0.1% TEA as the eluent.

Example 2

Salt forms of EP67 (SEQ ID NO:2) generated using the above procedures were incubated at varying concentrations with murine splenocytes over time. The HCl salt form outperformed the acetate (OAc) and, particularly, the TEA salt forms in terms of total amount of cytokine (IL-6) released from murine splenocytes and the kinetics of that release; i.e., the HCl form generated. maximal IL-6 release quicker than the other two salt forms.

A 24-hour dose response was investigated by incubating mouse spleen cells for 24 hrs with varying concentrations of the EP67 salts. Supernatants were collected and assayed for IL-6 by ELISA. The data is shown in Table I.

TABLE I

24-HR Dose Response

| Activator | μg/mL | IL-6 pg/ml ± SD |
|---|---|---|
| None | — | 176 ± 2 |
| EP67•TFA | 0.1 | 178 ± 1 |
| | 1.0 | 185 ± 2 |
| | 10 | 308 ± 7 |
| | 100 | 803 ± 6 |
| EP67•OAc⁻ | 0.1 | 188 ± 1 |
| | 1 | 325 ± 23 |
| | 10 | 225 ± 20 |
| | 100 | 780 ± 9 |
| EP67•HCl | 0.1 | 176 ± 3 |
| | 1.0 | 225 ± 1 |
| | 10 | 738 ± 5 |
| | 100 | 1163 ± 2 |

The SD represents the dilution errors within the experiment not experiment to experiment variation.

As seen from the data above, increasing the concentration to 10 or 100 μg/mL dramatically increases the amount of IL-6 produced in both the acetate and HCl forms. Nevertheless, the HCl form still far exceeds the OAc salt form.

Next, IL-6 kinetics were investigated by incubating mice spleen cells with 100 μg/mL of each salt form, and the release was examined over time. The results are shown in Table II.

TABLE II

IL-6 Kinetics

| Activator | Time collected (hr) | IL-6 pg/ml + SD |
|---|---|---|
| EP67•TFA | 6 | 55 ± 1 |
| | 24 | 803 ± 6 |
| | 48 | 442 ± 13 |
| | 72 | 75 ± 6 |
| EP67•OAc⁻ | 6 | 188 ± 1 |
| | 24 | 325 ± 23 |
| | 48 | 900 ± 17 |
| | 72 | 229 ±± 7 |
| EP67•HCl | 6 | 47 ± 1 |
| | 24 | 1163 ± 2 |
| | 48 | 923 ± 6 |
| | 72 | 200 ± 11 |

As can be seen from the data above, there is a dramatic increase in IL-6 levels within the first 24 hours after incubation with the HCl salt form, as compared to the other salt forms. In addition, the levels after 48 hours are still higher than the highest level seen with either the OAc or TFA salt forms. This is also illustrated in the graph in FIG. 5.

We have observed that in aqueous solution ($D_2O$) there are a greater number of nuclear Overhauser effect (NOE) signals in the HCl salt form of EP67 than the TFA salt form, suggesting a greater degree of structural integrity that is held for a longer period of time with the HCl salt form than with the TFA salt.

Discussion

Figure 5:
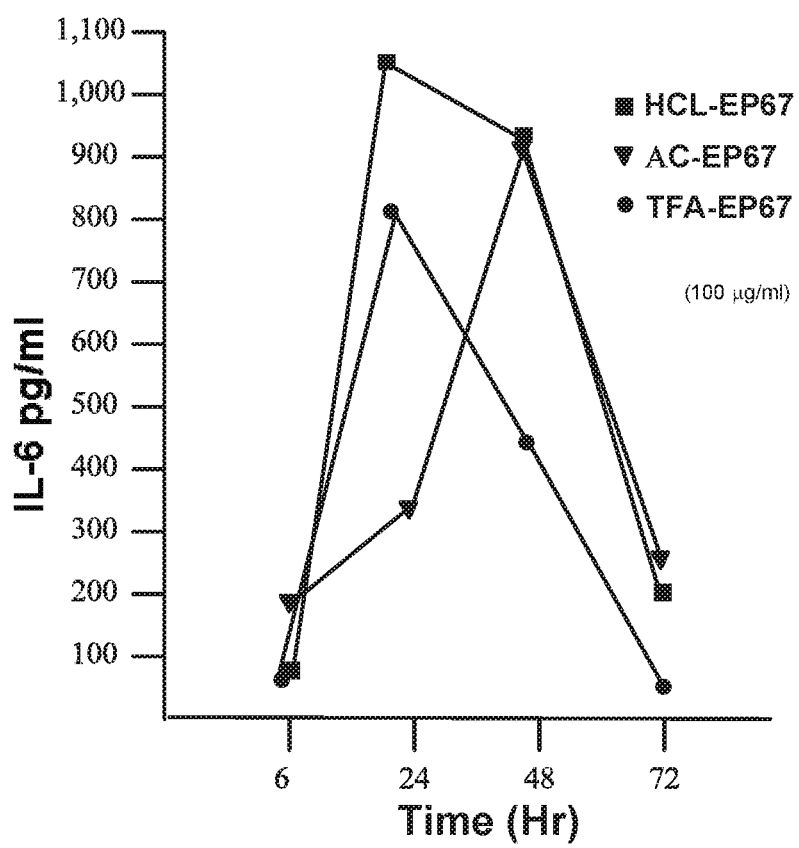
FIG. 5 is a graph of the IL-6 release kinetics over time for HCL, AC, and TFA salts of the C5a peptide analogs tested in Example 2 at 100 ng/ml.

As can be seen from the data in FIG. 5, a number of surprising results were seen with the HCl salt form of EP67 and derivatives, as compared to other salt forms. For example, there was a greater magnitude of cytokine release (IL-6) seen with the HCl salt form than with the acetate or TFA salt forms. In addition, the maximal release of cytokine (IL-6) was achieved quicker with the HCl salt form than the others. Also, in aqueous solution ($D_2O$) there was a greater number of NOEs with the HCl salt than with the TFA salt, suggesting a greater degree of structural/conformational integrity with the HCl. As a general rule, different salt forms of a small compound or peptide are not really given much importance except how they may affect synthesis economy and ease and what may be allowed for use in humans/animals by the regulatory agencies. Thus, these results are surprising, as we did not expect any difference at all (nor would have anyone else) based merely on different salt forms of the peptides.

The invention claimed is:

1. A hydrochloride (HCl) salt form of a C-terminal peptide analog of C5a, wherein the analog is a peptide comprising the formula:

(SEQ ID NO: 5)
            A1-Ser-The-Lys-A2-A3-A4-A5-A6-A7 wherein:

A1 is Tyr, Trp, or N-acetyl derivatives of Tyr or Trp;

A2 is Asp, Gly, Pro or N-methyl derivatives of Asp or Gly;

A3 is Ala, Cys, Leu, Met or N-methyl derivatives of Ala, Cys, Leu or Met;

A4 is Gln, Leu, Pro or N-methyl derivatives of Gln or Leu;

A5 is Pro, Leu, α-methyl Leu or N-methyl Leu;

A6 is D-Ala, Gly, D-Pro, aminoisobutyric acid (Aib) or N-methyl derivatives of D-Ala or Gly; and A7 is Arg or N-methyl Arg.

2. The HCl salt form of said C-terminal peptide analog of C5a according to claim 1, wherein said analog is selected from the group consisting of:

(SEQ ID NO: 6)
Tyr-Ser-Phe-Lys-Pro-Met-Pro-Leu-(D-Ala)-Arg;

(SEQ ID NO: 7)
Tyr-Ser-Phe-Lys-Asp-Ala-Pro-Leu-(D-Ala)-Arg;

(SEQ ID NO: 8)
Tyr-Ser-Phe-Lys-Asp-Met-Pro-Leu-(D-Ala)-Arg;

(SEQ ID NO: 9)
Tyr-Ser-Phe-Lys-Asp-Met-Pro-Leu-Gly-Arg;

(SEQ ID NO: 10)
Tyr-Ser-Phe-Lys-Asp-Ala-Pro-Leu-Gly-Arg ;

(SEQ ID NO: 11)
Tyr-Ser-Phe-Lys-Asp-Cys-Pro-Leu-Gly-Arg;

(SEQ ID NO: 12)
Tyr-Ser-Phe-Lys-Asp-Met-Pro-Leu-(D-Pro)-Arg;

(SEQ ID NO: 13)
Tyr-Ser-Phe-Lys-Asp-Met-Gln-Leu-(D-Ala)-Arg;

(SEQ ID NO: 14)
Tyr-Ser-Phe-Lys-Asp-Met-Gln-Leu-Gly-Arg;

(SEQ ID NO: 15)
Tyr-Ser-Phe-Lys-Asp-Met-Gln-Pro-Gly-Arg;

-continued

Tyr-Ser-Phe-Lys-Asp-Met-Pro-Leu-Aib-Arg;  (SEQ ID NO: 16)

Tyr-Ser-Phe-Lys-Gly-Met-Pro-Leu-Gly-Arg; and  (SEQ ID NO: 17)

Tyr-Ser-Phe-Lys-Gly-Leu-Leu-Leu-Gly-Arg.  (SEQ ID NO: 18)

3. The HCl salt form of said C-terminal peptide peptide analog of C5a according to claim 1, wherein said analog is designated as EP67 having the formula: Tyr-Ser-Phe-Lys-Asp-Met-Pro-(MethylLeu)-D-Ala-Arg (SEQ ID NO:2).

4. The HCl salt form of said C-terminal peptide analog of C5a according to claim 1, wherein said analog is a conformationally-stable peptide having the formula:

Tyr-Ser-Phe-Lys-Asp-Met-Xaa-(Xaa2)-(D-Ala)-Arg,  (SEQ ID NO: 1)

wherein Xaa is Pro, and Xaa2 is leucine or N-methyl leucine.

5. A composition comprising the HCl salt form of said C-terminal peptide analog of C5a according to claim 1, dispersed in a pharmaceutically acceptable carrier.

6. The composition of claim 5, further comprising adjuvants, other active agents, preservatives, buffering agents, salts, and mixtures thereof.

7. The composition of claim 6, wherein said active agent is selected from the group consisting of killed virus, modified live virus, viral or bacterial proteins, viral or bacterial DNA, toxoids, protein subunits, peptide epitope, and tumor antigens.

8. The composition of claim 7, wherein said active agent is conjugated to said peptide analog.

9. The composition of claim 7, said composition comprising a plurality of different active agents, each of said active agents conjugated to a respective peptide analog in said composition.

10. A kit comprising:
an HCl salt form of a C-terminal peptide analog of C5a according to claim 1; and
instructions for administering said analog to a subject in need thereof.

11. The kit of claim 10, wherein said peptide analog is provided in unit dosage form.

12. The kit of claim 10, wherein said peptide analog is provided in a first container, said kit further comprising a carrier in a second container; and instructions for preparing said peptide analog for administration to said subject.

13. A compound for enhancing an immune response to an immunogenic agent, said compound comprising an HCl salt form of a C-terminal peptide analog of C5a according to claim 1 covalently linked to an immunogenic agent.

14. The compound of claim 13, said immunogenic agent being selected from the group consisting of killed virus, modified live virus, viral or bacterial proteins, viral or bacterial DNA, toxoids, protein subunits, peptide epitopes, and tumor antigens.

15. A therapeutic or prophylactic medicament for inducing an immune response against an infection or cancer in a subject comprising an HCl salt form of a C-terminal peptide analog of C5a according to claim 1.

16. A method of inducing an immune response against an infection or cancer in a subject, said method comprising administering to said subject a therapeutically-effective amount of an HCl salt form of a C-terminal peptide analog of C5a according to claim 1.

17. The method of claim 16, wherein the infection or disease is caused by an infectious agent selected from the group consisting of bacteria, virus, and fungus.

18. The method of claim 16, wherein said peptide analog is dispersed in a pharmaceutically-acceptable carrier.

19. The method of claim 16, further comprising providing a unit dosage form of said peptide analog dispersed in a pharmaceutically-acceptable carrier prior to said administering.

20. The method of claim 16, wherein said peptide analog is administered intramuscularly, subcutaneously, intradermally, intranasally, intravenously, orally, or via a transdermal patch.

21. The method of claim 16, further comprising administering an active agent to said subject, said active agent being different from said peptide analog.

22. The method of claim 21, wherein said peptide analog and active agent are co-administered.

23. The method of claim 21, wherein said active agent is selected from the group consisting of killed virus, modified live virus, viral or bacterial proteins, viral or bacterial DNA, toxoids, protein subunits, peptide epitope, and tumor antigens.

24. The method of claim 21, wherein said active agent is conjugated to said peptide analog.

25. The method of claim 21, wherein said subject is a human or non-human animal.

* * * * *

```
                        SEQUENCE LISTING

<160> NUMBER OF SEQ ID NOS: 25

<210> SEQ ID NO 1
    <211> LENGTH: 10
    <212> TYPE: PRT
    <213> ORGANISM: Artificial Sequence
    <220> FEATURE:
    <223> OTHER INFORMATION: Synthetic peptide
    <220> FEATURE:
    <221> NAME/KEY: MOD_RES
    <222> LOCATION: (7)..(7)
    <223> OTHER INFORMATION: Xaa is Ala, Leu, IsoLeu, Aib, 3ib, dmP, mbP,
          ebP, MeA, MeL, MeI, substituted Pro analog, pseudoproline, Ser- or
          Thr-derived oxazolidine, Cys-derived thiazolidine, Tfm azetidine,
          Tfm homoserine, oxetanyl, Aid, Nai, Agl, Aza, or pipecolic acid
    <220> FEATURE:
    <221> NAME/KEY: MOD_RES
    <222> LOCATION: (8)..(8)
    <223> OTHER INFORMATION: Xaa is Leu or N-methyl Leu
    <220> FEATURE:
    <221> NAME/KEY: MOD_RES
    <222> LOCATION: (9)..(9)
    <223> OTHER INFORMATION: D-Ala

<400> SEQUENCE: 1

Tyr Ser Phe Lys Asp Met Xaa Xaa Ala Arg
    1               5                   10

<210> SEQ ID NO 2
    <211> LENGTH: 10
    <212> TYPE: PRT
    <213> ORGANISM: Artificial Sequence
    <220> FEATURE:
    <223> OTHER INFORMATION: Synthetic peptide
    <220> FEATURE:
    <221> NAME/KEY: MOD_RES
    <222> LOCATION: (8)..(8)
    <223> OTHER INFORMATION: N-methyl Leu
    <220> FEATURE:
    <221> NAME/KEY: MOD_RES
    <222> LOCATION: (9)..(9)
    <223> OTHER INFORMATION: D-Ala

<400> SEQUENCE: 2

Tyr Ser Phe Lys Asp Met Pro Leu Ala Arg
    1               5                   10

<210> SEQ ID NO 3
    <211> LENGTH: 10
    <212> TYPE: PRT
    <213> ORGANISM: Artificial Sequence
    <220> FEATURE:
    <223> OTHER INFORMATION: Synthetic Peptide
    <220> FEATURE:
    <221> NAME/KEY: MOD_RES
    <222> LOCATION: (7)..(7)
    <223> OTHER INFORMATION: Xaa is 2-aminoisobutyric acid
    <220> FEATURE:
    <221> NAME/KEY: MOD_RES
    <222> LOCATION: (9)..(9)
    <223> OTHER INFORMATION: D-Ala
```

```
<400> SEQUENCE: 3

Tyr Ser Phe Lys Asp Met Xaa Leu Ala Arg
1               5                   10

<210> SEQ ID NO 4
<211> LENGTH: 10
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
<222> LOCATION: (7)..(7)
<223> OTHER INFORMATION: Xaa is 5,5'-dimethylproline
<220> FEATURE:
<221> NAME/KEY: MOD_RES
<222> LOCATION: (8)..(8)
<223> OTHER INFORMATION: N-methyl Leu
<220> FEATURE:
<221> NAME/KEY: MOD_RES
<222> LOCATION: (9)..(9)
<223> OTHER INFORMATION: D-Ala

<400> SEQUENCE: 4

Tyr Ser Phe Lys Asp Met Xaa Leu Ala Arg
1               5                   10

<210> SEQ ID NO 5
<211> LENGTH: 10
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
<222> LOCATION: (1)..(1)
<223> OTHER INFORMATION: Xaa is Tyr, Trp, or a N-acetyl derivatives of
      Tyr or Trp
<220> FEATURE:
<221> NAME/KEY: MOD_RES
<222> LOCATION: (5)..(5)
<223> OTHER INFORMATION: Xaa is Asp, Gly, Pro or a N-methyl derivatives
      of Asp or Gly
<220> FEATURE:
<221> NAME/KEY: MOD_RES
<222> LOCATION: (6)..(6)
<223> OTHER INFORMATION: Xaa is Ala, Cys, Leu, Met or a N-methyl
      derivatives of Ala, Cys, Leu or Met
<220> FEATURE:
<221> NAME/KEY: MOD_RES
<222> LOCATION: (7)..(7)
<223> OTHER INFORMATION: Xaa is Gln, Leu, Pro or a N-methyl derivatives
      of Gln or Leu
<220> FEATURE:
<221> NAME/KEY: MOD_RES
<222> LOCATION: (8)..(8)
<223> OTHER INFORMATION: Xaa is Pro, Leu, alpha-methyl Leu or N-methyl
      Leu
<220> FEATURE:
<221> NAME/KEY: MOD_RES
<222> LOCATION: (9)..(9)
<223> OTHER INFORMATION: Xaa is D-Ala, Gly, D-Pro, Aib or a N-methyl
      derivatives of D-Ala or Gly
<220> FEATURE:
<221> NAME/KEY: MOD_RES
<222> LOCATION: (10)..(10)
<223> OTHER INFORMATION: Xaa is Arg or N-methyl Arg

<400> SEQUENCE: 5

Xaa Ser Phe Lys Xaa Xaa Xaa Xaa Xaa Xaa
1               5                   10
```

```
<210> SEQ ID NO 6
<211> LENGTH: 10
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
<222> LOCATION: (9)..(9)
<223> OTHER INFORMATION: D-Ala

<400> SEQUENCE: 6

Tyr Ser Phe Lys Pro Met Pro Leu Ala Arg
1               5                   10

<210> SEQ ID NO 7
<211> LENGTH: 10
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
<222> LOCATION: (9)..(9)
<223> OTHER INFORMATION: D-Ala

<400> SEQUENCE: 7

Tyr Ser Phe Lys Asp Ala Pro Leu Ala Arg
1               5                   10

<210> SEQ ID NO 8
<211> LENGTH: 10
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
<222> LOCATION: (9)..(9)
<223> OTHER INFORMATION: D-Ala

<400> SEQUENCE: 8

Tyr Ser Phe Lys Asp Met Pro Leu Ala Arg
1               5                   10

<210> SEQ ID NO 9
<211> LENGTH: 10
<212> TYPE: PRT
<213> ORGANISM: Artificial Sequence
<220> FEATURE:
<223> OTHER INFORMATION: Synthetic peptide

<400> SEQUENCE: 9

Tyr Ser Phe Lys Asp Met Pro Leu Gly Arg
1               5                   10

<210> SEQ ID NO 10
<211> LENGTH: 10
<212> TYPE: PRT
<213> ORGANISM: Artificial Sequence
<220> FEATURE:
<223> OTHER INFORMATION: Synthetic peptide

<400> SEQUENCE: 10

Tyr Ser Phe Lys Asp Ala Pro Leu Gly Arg
1               5                   10

<210> SEQ ID NO 11
<211> LENGTH: 10
```

```
<212> TYPE: PRT
<213> ORGANISM: Artificial Sequence
<220> FEATURE:
<223> OTHER INFORMATION: Synthetic peptide

<400> SEQUENCE: 11

Tyr Ser Phe Lys Asp Cys Pro Leu Gly Arg
1               5                   10

<210> SEQ ID NO 12
<211> LENGTH: 10
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
<222> LOCATION: (9)..(9)
<223> OTHER INFORMATION: D-Pro

<400> SEQUENCE: 12

Tyr Ser Phe Lys Asp Met Pro Leu Pro Arg
1               5                   10

<210> SEQ ID NO 13
<211> LENGTH: 10
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
<222> LOCATION: (9)..(9)
<223> OTHER INFORMATION: D-Ala

<400> SEQUENCE: 13

Tyr Ser Phe Lys Asp Met Gln Leu Ala Arg
1               5                   10

<210> SEQ ID NO 14
<211> LENGTH: 10
<212> TYPE: PRT
<213> ORGANISM: Artificial Sequence
<220> FEATURE:
<223> OTHER INFORMATION: Synthetic peptide

<400> SEQUENCE: 14

Tyr Ser Phe Lys Asp Met Gln Leu Gly Arg
1               5                   10

<210> SEQ ID NO 15
<211> LENGTH: 10
<212> TYPE: PRT
<213> ORGANISM: Artificial Sequence
<220> FEATURE:
<223> OTHER INFORMATION: Synthetic peptide

<400> SEQUENCE: 15

Tyr Ser Phe Lys Asp Met Gln Pro Gly Arg
1               5                   10

<210> SEQ ID NO 16
<211> LENGTH: 10
<212> TYPE: PRT
<213> ORGANISM: Artificial Sequence
<220> FEATURE:
<223> OTHER INFORMATION: Synthetic peptide
<220> FEATURE:
<221> NAME/KEY: MOD_RES
```

```
<222> LOCATION: (9)..(9)
<223> OTHER INFORMATION: Xaa is Aib

<400> SEQUENCE: 16

Tyr Ser Phe Lys Asp Met Pro Leu Xaa Arg
1               5                   10

<210> SEQ ID NO 17
<211> LENGTH: 10
<212> TYPE: PRT
<213> ORGANISM: Artificial Sequence
<220> FEATURE:
<223> OTHER INFORMATION: Synthetic peptide

<400> SEQUENCE: 17

Tyr Ser Phe Lys Gly Met Pro Leu Gly Arg
1               5                   10

<210> SEQ ID NO 18
<211> LENGTH: 10
<212> TYPE: PRT
<213> ORGANISM: Artificial Sequence
<220> FEATURE:
<223> OTHER INFORMATION: Synthetic peptide

<400> SEQUENCE: 18

Tyr Ser Phe Lys Gly Leu Leu Leu Gly Arg
1               5                   10

<210> SEQ ID NO 19
<211> LENGTH: 9
<212> TYPE: PRT
<213> ORGANISM: Artificial Sequence
<220> FEATURE:
<223> OTHER INFORMATION: Synthetic peptide

<400> SEQUENCE: 19

Asn Ser Asp Thr Val Gly Trp Ser Trp
1               5

<210> SEQ ID NO 20
<211> LENGTH: 9
<212> TYPE: PRT
<213> ORGANISM: Artificial Sequence
<220> FEATURE:
<223> OTHER INFORMATION: Synthetic peptide

<400> SEQUENCE: 20

Gln Ile Gly Asn Ile Ile Ser Ile Trp
1               5

<210> SEQ ID NO 21
<211> LENGTH: 9
<212> TYPE: PRT
<213> ORGANISM: Artificial Sequence
<220> FEATURE:
<223> OTHER INFORMATION: Synthetic peptide

<400> SEQUENCE: 21

Ser Val Glu Met Asn Ala Pro Asn Tyr
1               5

<210> SEQ ID NO 22
<211> LENGTH: 10
<212> TYPE: PRT
<213> ORGANISM: Artificial Sequence
<220> FEATURE:
```

```
<223> OTHER INFORMATION: Synthetic peptide

<400> SEQUENCE: 22

Gly Leu Asp Cys Ile Arg Pro Cys Phe Trp
1               5                   10

<210> SEQ ID NO 23
<211> LENGTH: 9
<212> TYPE: PRT
<213> ORGANISM: Artificial Sequence
<220> FEATURE:
<223> OTHER INFORMATION: Synthetic peptide

<400> SEQUENCE: 23

Leu Ser Thr Ala Ser Ser Trp Ser Tyr
1               5

<210> SEQ ID NO 24
<211> LENGTH: 9
<212> TYPE: PRT
<213> ORGANISM: Artificial Sequence
<220> FEATURE:
<223> OTHER INFORMATION: Synthetic peptide

<400> SEQUENCE: 24

Asn Ala Asp Thr Leu Cys Ile Gly Tyr
1               5

<210> SEQ ID NO 25
<211> LENGTH: 10
<212> TYPE: PRT
<213> ORGANISM: Artificial Sequence
<220> FEATURE:
<223> OTHER INFORMATION: Synthetic peptide

<400> SEQUENCE: 25

Leu Leu Glu Asn Glu Arg Thr Leu Asp Tyr
1               5                   10
```